(12) United States Patent
Šindler et al.

(10) Patent No.: US 12,614,894 B2
(45) Date of Patent: Apr. 28, 2026

(54) SWITCHGEAR CURRENT TRANSFORMER REPLACEMENT SYSTEM

(71) Applicant: ABB Schweiz AG, Baden (CH)

(72) Inventors: Karel Šindler, Brno (CZ); Karel Šindler, Brno (CZ)

(73) Assignee: ABB Schweiz AG, Baden (CH)

( * ) Notice: Subject to any disclaimer, the term of this patent is extended or adjusted under 35 U.S.C. 154(b) by 189 days.

(21) Appl. No.: 18/537,059

(22) Filed: Dec. 12, 2023

(65) Prior Publication Data

US 2024/0204490 A1 Jun. 20, 2024

(30) Foreign Application Priority Data

Dec. 15, 2022 (EP) .................................... 22213716

(51) Int. Cl.
H02B 1/052 (2006.01)
H02B 11/167 (2006.01)
H02B 13/035 (2006.01)

(52) U.S. Cl.
CPC ........... H02B 1/052 (2013.01); H02B 11/167 (2013.01); H02B 13/0356 (2013.01)

(58) Field of Classification Search
CPC .... H02B 3/00; H02B 13/0356; H02B 11/167; H02B 1/052
See application file for complete search history.

(56) References Cited

U.S. PATENT DOCUMENTS

| | | | | |
|---|---|---|---|---|
| 3,034,658 A | * | 5/1962 | Balogh | B66C 13/18 |
| | | | | 212/238 |
| 3,467,217 A | * | 9/1969 | Zwight | B66F 11/046 |
| | | | | 182/2.11 |
| 3,973,754 A | * | 8/1976 | Chadwick, Jr. | B66C 19/005 |
| | | | | 254/323 |
| 4,042,941 A | * | 8/1977 | Campbell | B66F 19/00 |
| | | | | 212/344 |
| 2012/0200988 A1 | * | 8/2012 | Uchida | H05K 1/029 |
| | | | | 361/624 |
| 2013/0174497 A1 | * | 7/2013 | Brown | E04H 5/04 |
| | | | | 52/79.5 |

(Continued)

FOREIGN PATENT DOCUMENTS

| | | | |
|---|---|---|---|
| CN | 201234073 Y | | 5/2009 |
| CN | 216289511 U | * | 12/2022 |

OTHER PUBLICATIONS

European Patent Office, Extended European Search Report in European Patent Application No. 22213716.8, 12 pp. (May 25, 2023).

*Primary Examiner* — Timothy J Thompson
*Assistant Examiner* — Rhadames Alonzo Miller
(74) *Attorney, Agent, or Firm* — Fitch Even Tabin & Flannery LLP

(57) ABSTRACT

A switchgear current transformer replacement system includes a truck system having a connection section. The truck system engages with and moves along a rail system of a compartment of a switchgear. The connection section connects to a current transformer. The truck system is positioned along the rail system to a position adjacent to the current transformer so the connection section connects to the current transformer and moves it away from its operational location within the compartment of the switchgear.

5 Claims, 8 Drawing Sheets

(56) References Cited

U.S. PATENT DOCUMENTS

| | | | | |
|---|---|---|---|---|
| 2013/0176046 | A1* | 7/2013 | Brown ............... | G01R 31/1227 |
| | | | | 324/750.25 |
| 2016/0300655 | A1* | 10/2016 | teNyenhuis ........... | H01F 27/004 |
| 2019/0093382 | A1* | 3/2019 | Sauber ................. | E04H 12/187 |
| 2023/0187913 | A1* | 6/2023 | Grant, Jr. ................ | H02G 1/04 |
| | | | | 254/134.3 R |

* cited by examiner

SWITCHGEAR CURRENT TRANSFORMER REPLACEMENT SYSTEM

CROSS-REFERENCE TO RELATED APPLICATIONS

The instant application claims priority to European Patent Application No. 22213716.8, filed Dec. 15, 2022, which is incorporated herein in its entirety by reference.

FIELD OF THE DISCLOSURE

The present disclosure relates to switchgear current transformer replacement systems and switchgear current transformer replacement methods.

BACKGROUND OF THE INVENTION

Current transformers in switchgear (or panels) are sometimes required to be replaced, because the current transformer could be faulty or the voltage rating of the switchgear could be changing, or the current transformer has come to the end of its lifetime.

However, it is a difficult job to replace these current transformers because they tend to be heavy, bulky and be in locations of a switchgear compartment that are difficult to assess.

In many cases, replacement of current transformers takes a long time, and requires access to both the front and rear of the compartment of the switchgear and can require removal of front and rear walls of the compartment of the switchgear.

BRIEF SUMMARY OF THE INVENTION

Therefore, it would be advantageous to have an improved technique for replacing switchgear current transformers. In a first aspect, there is provided a switchgear current transformer replacement system comprising a truck system. The truck system comprises a connection section. The truck system is configured to engage with and move along one or more rails of a rail system of a compartment of a switchgear. The connection section of the truck system is configured to connect to a current transformer. The truck system when engaged with the one or more rails of the rail system is configured to move along the one or more rails of the rail system to a position adjacent to the current transformer at its operational location within the compartment of the switchgear. When the truck system is engaged with the one or more rails of the rail system, and when the truck system is adjacent to the current transformer at its operational location within the compartment of the switchgear the connection section of the truck system is configured to connect to the current transformer. When the truck system is connected to the current transformer, and when the truck system is engaged with the one or more rails of the rail system and when the connection section is connected to the current transformer the truck system is configured to move along the one or more rails of the rail system with the current transformer to move the current transformer away from its operational location within the compartment of the switchgear.

Thus, a truck system can be placed on and moved along existing rails in a compartment of a switchgear in a first direction in order to move up to a current transformer in the compartment. The truck system can then connect to the current transformer in order to extract the current transformer by moving the truck system in a second direction opposite to the first direction. In this way, a simple means is provided to help replace current transformers in a switchgear compartment that only requires one side of the compartment to be opened, reducing the time to replace current transformers, reducing the chance of injury, and saving costs and work and downtime considerably.

BRIEF DESCRIPTION OF THE SEVERAL VIEWS OF THE DRAWING(S)

DETAILED DESCRIPTION OF THE INVENTION

Figure 1:
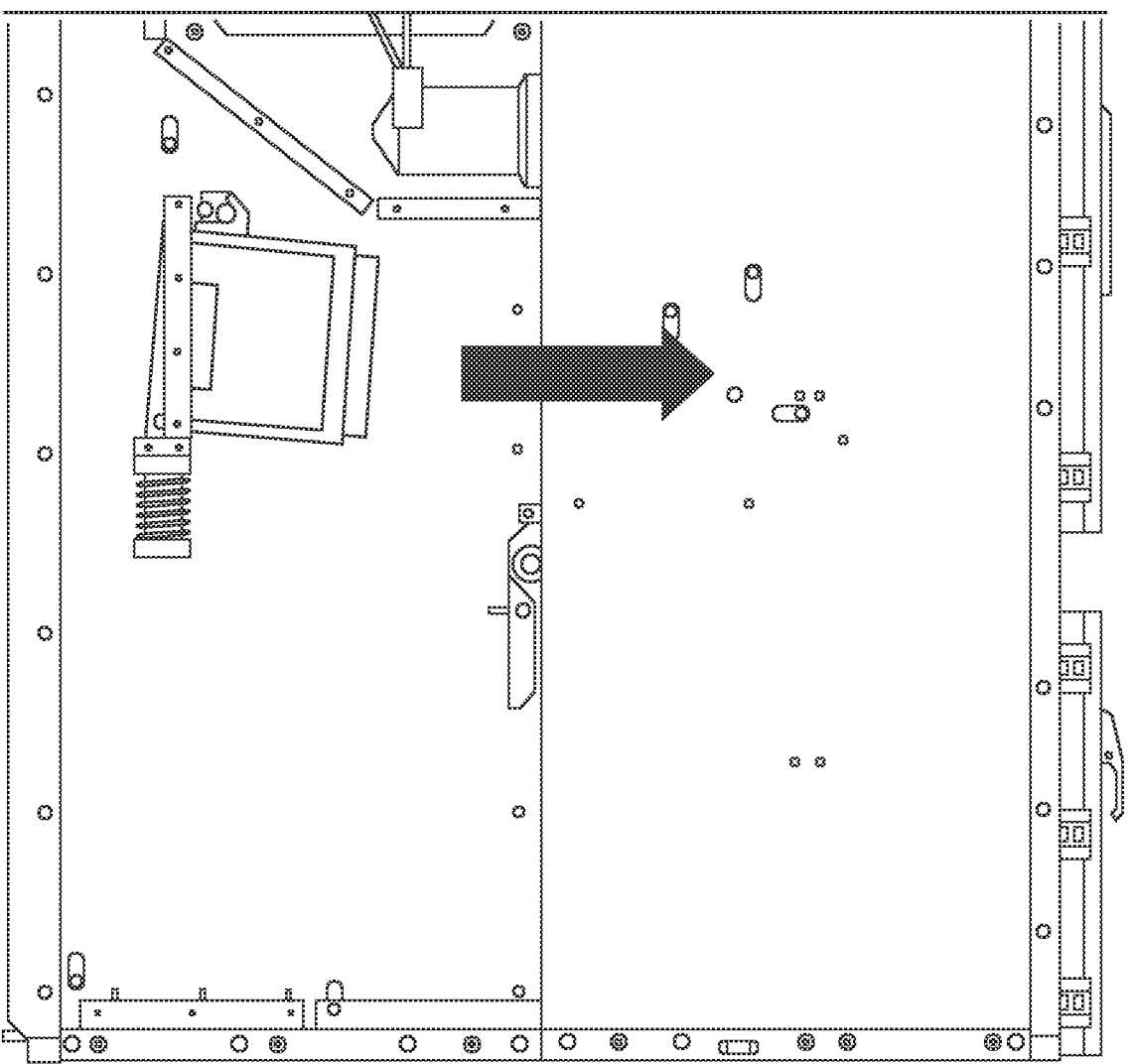
FIG. 1 is a side view of a switchgear compartment in accordance with the disclosure.
Figure 2:
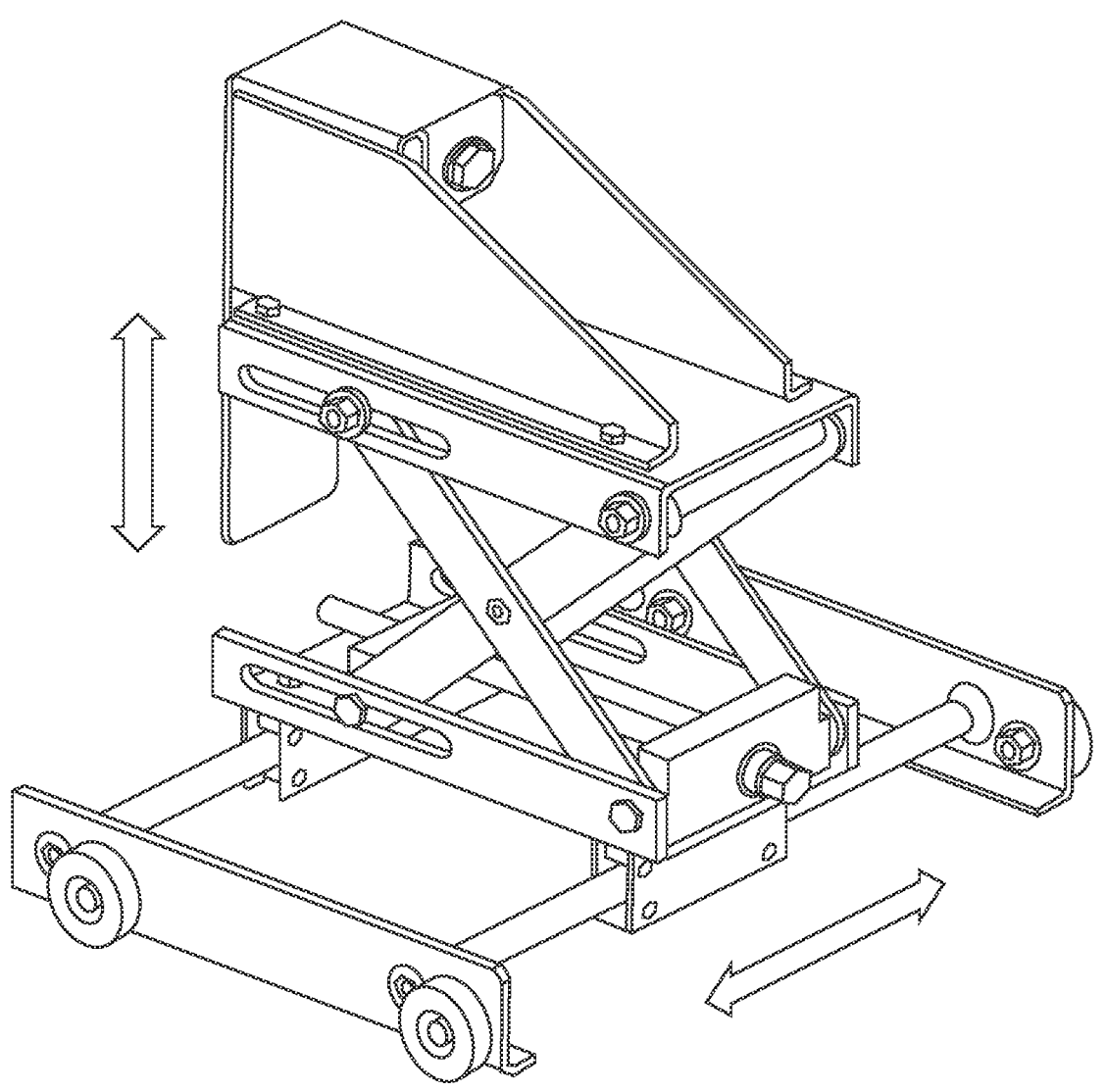
FIG. 2 is an outline view of a truck system in accordance with the disclosure.
Figures 3A, 3B, 3C, 3D, 3E, 3F:
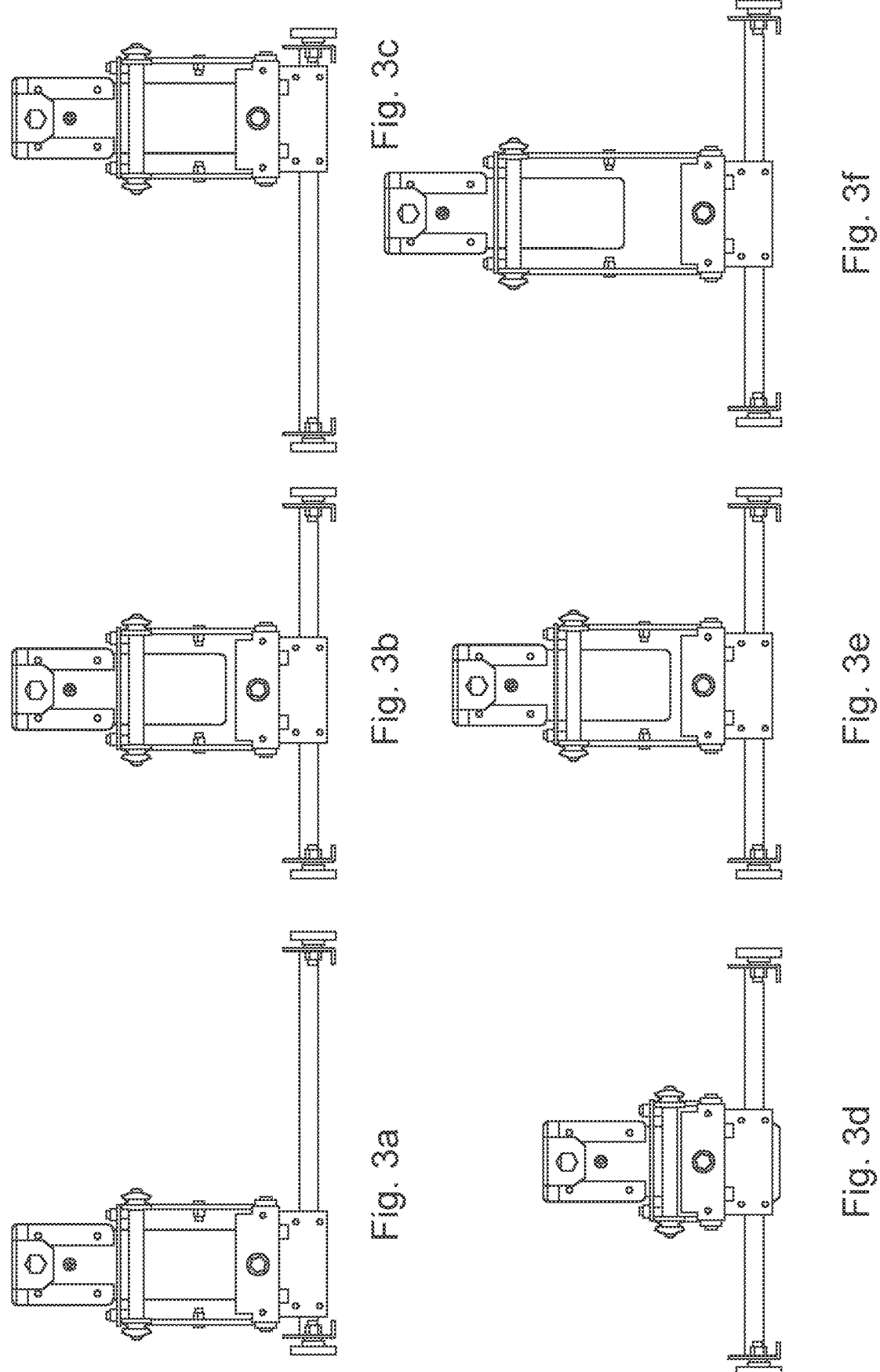
FIGS. 3a-3f are several views of different operating positions of the truck system of FIG. 2.
Figure 4:
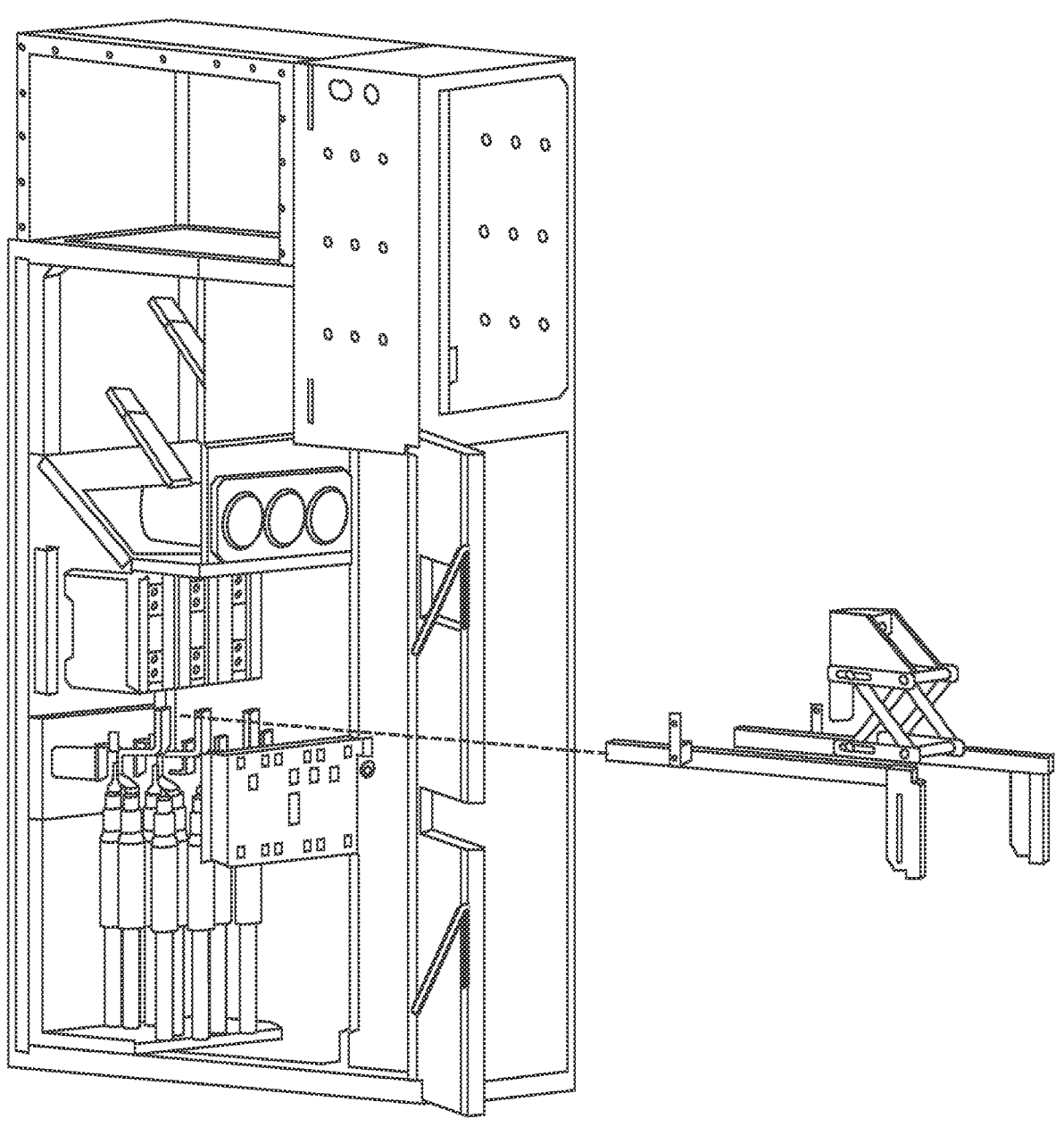
FIGS. 4 and 5 are two views of a partially disassembled view of a switchgear having rails for a truck system, and a truck system engaged with the rails, in accordance with the disclosure.
Figure 5:
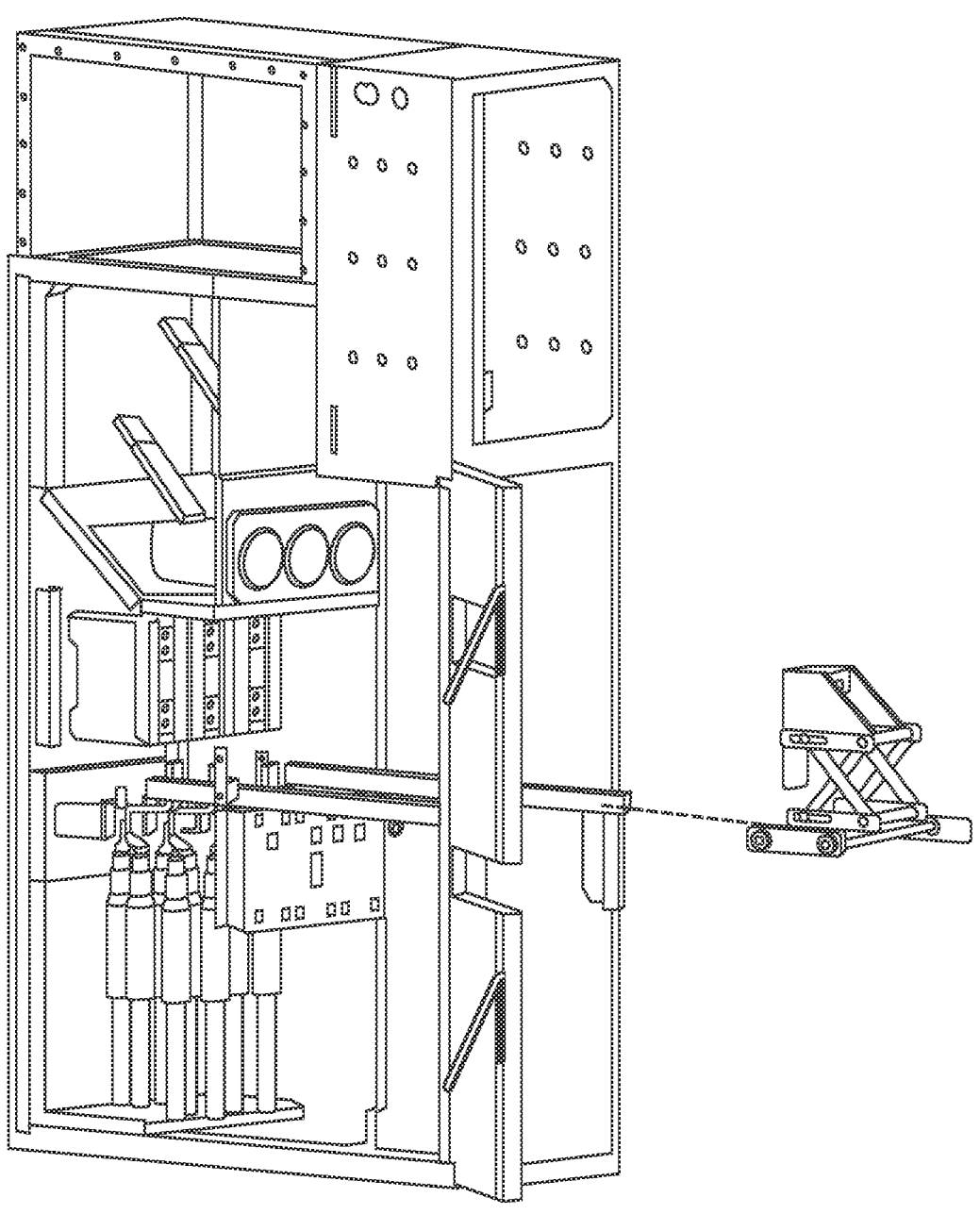
Figure 6:
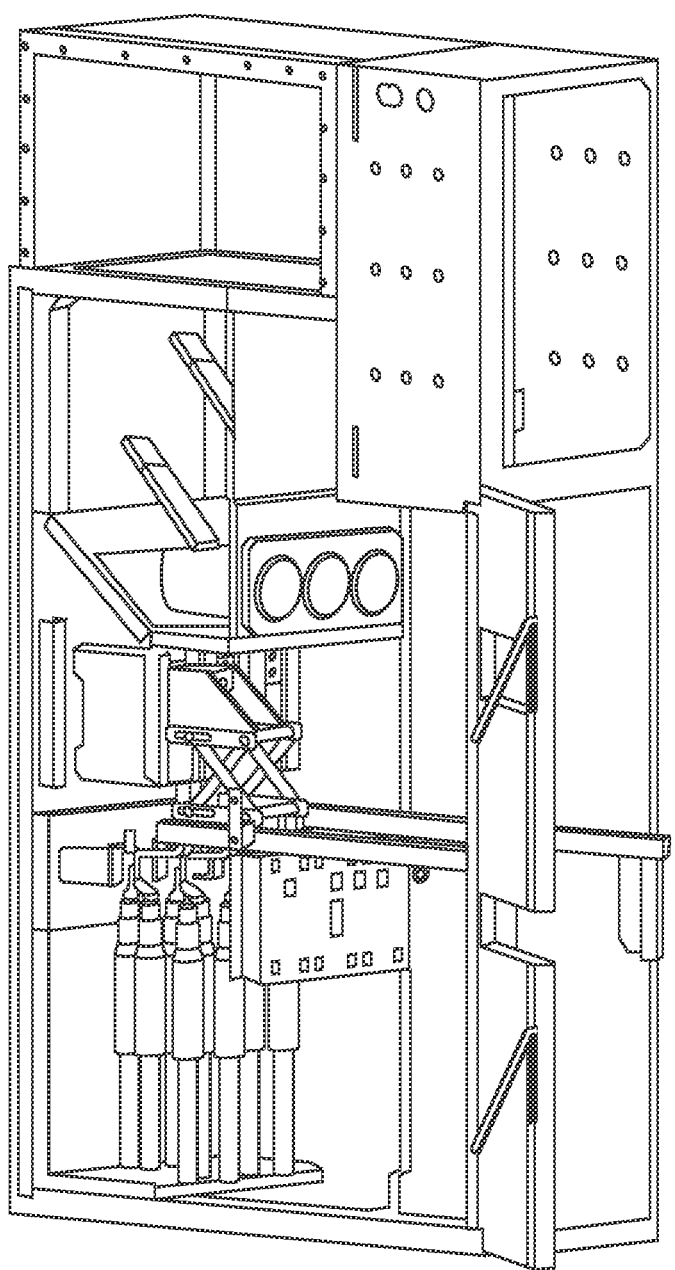
FIG. 6 shows the compartment of the switchgear as shown in FIGS. 4 and 5, where truck system has engaged with the rail system mounted within the switchgear and the truck system has engaged with the rail system with its wheels placed on the rails, and the truck system has been moved forwards by rolling along its wheels to be adjacent to a current transformer.
Figure 7:
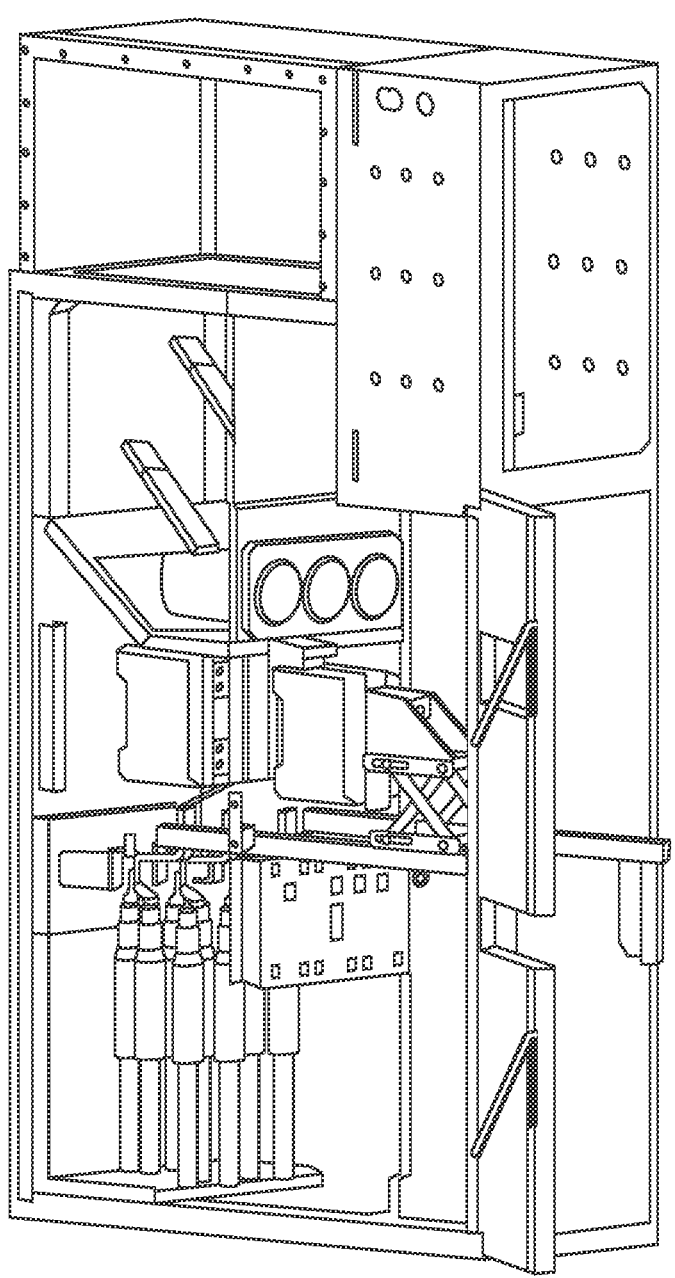
FIG. 7 shows the compartment of the switchgear as shown in FIGS. 4-6, where a connection section of the truck system has connected to the current transformer and the truck system along with the current transformer has been moved backwards by rolling along its wheels to move the current transformer away from its operational location.
Figure 8:
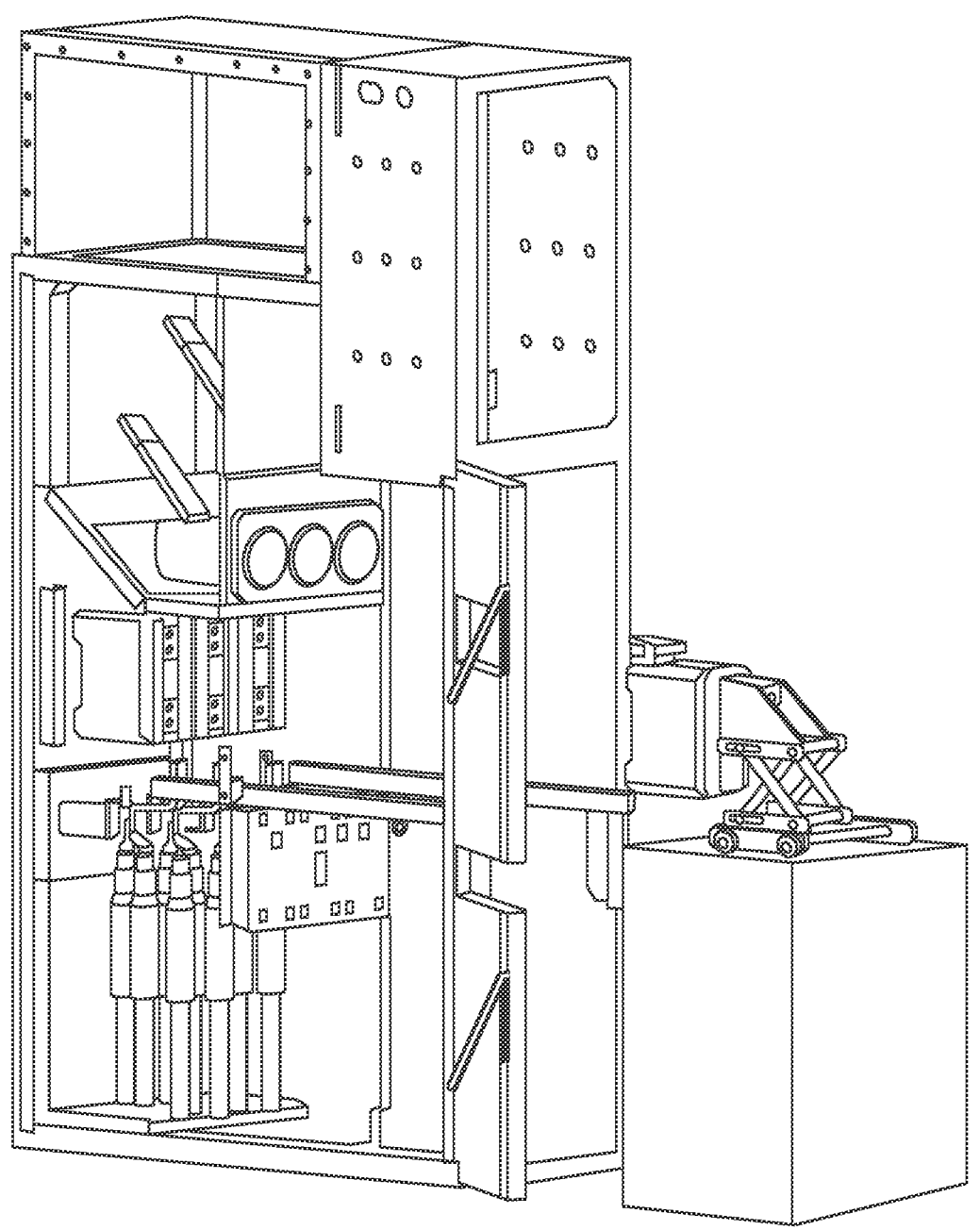
FIG. 8 shows the compartment of the switchgear as shown in FIGS. 4-7, where the truck system along with the current transformer has been moved to the end of the rails of the rail system and dis-engaged from the rails in order to remove the current transformer from the switchgear compartment.

FIG. 1 shows a sideview of a switchgear compartment with an arrow showing how a current transformer is to be removed from the compartment, where the current transformer is located at the rear of the arrow. FIG. 2 shows a truck system, with wheels that engage with rails of a rail system mounted to or of a switchgear, and where a center connection section can be moved laterally and vertically. FIGS. 3a-3f show several views of a truck system, with wheels that engage with rails of a rail system mounted to or of a switchgear, and where a center connection section can be moved laterally and vertically. FIG. 4 shows a compartment of a switchgear on the left within which are three current transformers and on the right a switchgear current transformer replacement system having a rail system and a truck system, where the truck system is shown already engaged with the rail system. FIG. 5 shows the compartment of the switchgear as shown in FIG. 4, where the rail system of the switchgear current transformer replacement system has been mounted within the compartment, and where the truck system is shown on the right. FIG. 6 shows the compartment of the switchgear as shown in FIGS. 4-5, where truck system has engaged with the rail system mounted within the switchgear and the truck system has engaged with the rail system with its wheels placed on the rails, and the truck system has been moved forwards by rolling along its wheels to be adjacent to a current transformer. FIG. 7 shows the compartment of the switchgear as shown in FIGS. 4-6, where a connection section of the truck system has connected to the current transformer and the truck system along with the current transformer has been moved backwards by rolling along its wheels to move the current transformer away from its operational location. FIG. 8 shows the compartment of the switchgear as shown in FIGS. 4-7, where the truck system along with the current transformer has been moved to the end of the rails of the rail system and dis-engaged from the rails in order to remove the current transformer from the switchgear compartment.

In reference to these figures, FIG. 1 shows a sideview of a switchgear compartment with an arrow showing how a current transformer is to be removed from the compartment, where the current transformer is located at the rear of the arrow. FIGS. 2-8 relate to the new switchgear current transformer replacement systems and the new switchgear current transformer replacement methods.

In an exemplary embodiment, a switchgear current transformer replacement system comprises a truck system. The truck system comprises a connection section. The truck system is configured to engage with and move along one or more rails of a rail system of a compartment of a switchgear. The connection section of the truck system is configured to connect to a current transformer. The truck system when engaged with the one or more rails of the rail system is configured to move along the one or more rails of the rail system to a position adjacent to the current transformer at its operational location within the compartment of the switchgear. When the truck system is engaged with the one or more rails of the rail system, and when the truck system is adjacent to the current transformer at its operational location within the compartment of the switchgear the connection section of the truck system is configured to connect to the current transformer. When the truck system is connected to the current transformer, and when the truck system is engaged with the one or more rails of the rail system and when the connection section is connected to the current transformer the truck system is configured to move along the one or more rails of the rail system with the current transformer to move the current transformer away from its operational location within the compartment of the switchgear.

The truck system can be placed on and moved along existing rails in a compartment of a switchgear in a first direction in order to move up to a current transformer in the compartment. The truck system can then connect to the current transformer in order to extract the current transformer by moving the truck system in a second direction opposite to the first direction. In this way, a simple process is provided to help replace current transformers in a switchgear compartment that only requires one side of the compartment to be opened.

In an example, the one or more rails of the rail system comprises at least two rails parallel to each other. In this manner, a stable platform for the truck system is provided.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails. Thus, the truck system can be easily placed on or engaged with the rail(s) of the rail system, and easily moved forward and backwards along the rail(s) to extract a current transformer, and then replace the current transformer with a new unit.

In an example, the truck system when engaged with the one or more rails of the rail system is configured to move the connection section in at least one direction perpendicular to the one or more rails of the rail system.

In an example, the truck system is configured to move the connection section of the truck system in a direction parallel to a direction extending from a first rail of the one or more rails to a second rail of the one or more rails, and wherein the truck system is configured to move the connection section of the truck system in a direction perpendicular to the direction extending from the first rail of the one or more rails to the second rail of the one or more rails.

In this manner, the truck system can be accurately aligned with a current transformer in order to remove it from the compartment, and indeed the truck system can also be aligned with each current transformer for each phase of a three-phase system enabling the current transformer for any of the phases to be replaced.

In an example a switchgear current transformer replacement system comprises a rail system, and a truck system. The rail system is configured to be mounted to a compartment of a switchgear. The rail system comprises one or more rails. The truck system comprises a connection section. The truck system is configured to move along the one or more rails of the rail system. The connection section of the truck system is configured to connect to a current transformer. When the rail system is mounted to the compartment of the switchgear, the truck system is configured to move along the one or more rails of the rail system to a position adjacent to the current transformer at its operational location within the compartment of the switchgear. When the truck system is adjacent to the current transformer at its operational location within the compartment of the switchgear the connection section of the truck system is configured to connect to the current transformer. When the truck system is connected to the current transformer, and when the connection section is connected to the current transformer, the truck system is configured to move along the one or more rails of the rail system with the current transformer to move the current transformer away from its operational location within the compartment of the switchgear.

In this manner, a special set of rails can be mounted to a compartment of a switchgear, for example at locations of circuit breaker rails or tracks.

Then a truck system can be moved along the rails in a first direction in order to move up to a current transformer in the compartment. The truck system can then connect to the current transformer in order to extract the current transformer by moving the truck system in a second direction opposite to the first direction. In this way, a simple means is provided to help replace current transformers in a switchgear compartment that only requires one side of the compartment to be opened, reducing the time to replace current transformers, and saving costs and work and downtime considerably. The rails can then be removed from the compartment.

In an example, the truck system is configured to engage with the one or more rails of the rail system of the compartment of the switchgear prior to moving the truck system along the one or more rails of the rail system. Thus, the rail system that is mounted to the compartment of the switchgear can have a truck system integrated with it, or the truck system can be separate to the rail system. In this manner, the new system can be utilized with existing switchgear and their compartments in that the rail(s) are mounted to the existing compartments. Or existing rails of switchgear can be utilized, such as circuit breaker rails in certain situations, or new switchgear compartments can be manufactured with rail(s) of the new system already present with the compartment that will house current transformers.

In an example, the one or more rails of the rail system comprises at least two rails parallel to each other.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails.

In an example, the truck system when engaged with the one or more rails of the rail system is configured to move the connection section in at least one direction perpendicular to the one or more rails of the rail system.

In an example, the truck system is configured to move the connection section of the truck system in a direction parallel to a direction extending from a first rail of the one or more rails to a second rail of the one or more rails, and the truck system is configured to move the connection section of the truck system in a direction perpendicular to the direction extending from the first rail of the one or more rails to the second rail of the one or more rails.

In an example a switchgear current transformer replacement method comprises engaging a truck system with one or more rails of a rail system of a compartment of a switchgear; moving the truck system along the one or more rails of a rail system of the compartment of the switchgear to a position adjacent to a current transformer of the switchgear at its operational location within the compartment of the switchgear; connecting a connection section of the truck system to the current transformer; and moving the truck system along the one or more rails of the rail system with the current transformer to move the current transformer away from its operational location within the compartment of the switchgear.

In an example, the one or more rails of the rail system comprises at least two rails parallel to each other.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails.

In an example, the method comprises moving the connection section in at least one direction perpendicular to the one or more rails of the rail system.

In an example, the method comprises moving the connection section of the truck system in a direction parallel to a direction extending from a first rail of the one or more rails to a second rail of the one or more rails.

In an example, the method comprises moving the connection section of the truck system in a direction perpendicular to the direction extending from the first rail of the one or more rails to the second rail of the one or more rails.

In an example a switchgear current transformer replacement method comprises mounting a rail system to a compartment of a switchgear, wherein the rail system comprises one or more rails; moving a truck system along the one or more rails of the rail system to a position adjacent to a current transformer at its operational location within the compartment of the switchgear; connecting a connection section of the truck system to the current transformer; and moving the truck system along the one or more rails of the rail system with the current transformer to move the current transformer away from its operational location within the compartment of the switchgear.

In an example, the method comprises engaging the truck system with the one or more rails of the rail system of the compartment of the switchgear prior to moving the truck system along the one or more rails of the rail system.

In an example, the one or more rails of the rail system comprises at least two rails parallel to each other.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails.

In an example, the method comprises moving the connection section in at least one direction perpendicular to the one or more rails of the rail system.

In an example, the method comprises moving the connection section of the truck system in a direction parallel to a direction extending from a first rail of the one or more rails to a second rail of the one or more rails.

In an example, the method comprises moving the connection section of the truck system in a direction perpendicular to the direction extending from the first rail of the one or more rails to the second rail of the one or more rails.

The new switchgear current transformer replacement systems and the new switchgear current transformer replacement methods and now described in further specific detail, where reference is again made to FIGS. 1-8.

FIG. 1 shows a sideview of a switchgear compartment with an arrow showing how a current transformer is to be removed from the compartment, where the current transformer is located at the rear of the arrow. The current transformer is heavy, and its location means that until development of the new switchgear current transformer replacement systems and the new switchgear current transformer replacement methods, the front walls and rears of the compartment has to be opened to allow access to personnel to remove a current transformer.

FIG. 2 shows a newly developed truck system, with wheels that engage with rails of a rail system mounted to or of a switchgear, and where a center connection section can be moved laterally and vertically. The connection section in the middle can slide sideways on bars extending between plates that hold two sets of wheels on either side that engage with the rails of the rail system. The wheels can sit on top of the rails or slide down a center conduit open on the inside of the rails, such that once engaged with the rails the wheels cannot be lifted off the rails, but only slid out of the end. The connection section also has a scissor like extension functionality enabling leg sections joined at midpoints to change the angle between them by using a threaded screw to raise and lower the part of the connection section that will connect to a current transformer.

FIGS. 3a-3f show several views of a truck system, with wheels that engage with rails of a rail system mounted to or of a switchgear, and where a center connection section can be moved laterally and vertically. This shows different horizontal positions of the connection section and different vertical positions of the connection section.

FIG. 4 shows a compartment of a switchgear on the left within which are three current transformers and on the right a switchgear current transformer replacement system having a rail system and a truck system, where the truck system is shown already engaged with the rail system. This shows a representation of how the new switchgear current transformer replacement system will interact with the switchgear compartment. The truck system is shown already engaged with the rail system, but it can disengage from the rail system if required. Also, the rail system is shown separate to the switchgear compartment, but existing rails of a switchgear can be utilized in certain situation.

FIG. 5 shows the compartment of the switchgear as shown in FIG. 4, where the rail system of the switchgear current transformer replacement system has been mounted within the compartment, and where the truck system is shown on the right.

FIG. 6 shows the compartment of the switchgear as shown in FIGS. 4 and 5, where the truck system has engaged with the rail system mounted within the switchgear and the truck system has engaged with the rail system with its wheels placed on the rails. The truck system has been moved forwards by rolling along its wheels to be adjacent to a current transformer. The connection section of the truck system is then mechanically connected to the current transformer.

FIG. 7 shows the compartment of the switchgear as shown in FIGS. 4 through 6, where a connection section of the truck system has connected to the current transformer and the truck system along with the current transformer has been moved backwards by rolling along its wheels to move the current transformer away from its operational location.

FIG. 8 shows the compartment of the switchgear as shown in FIGS. 4 through 7, where the truck system along with the current transformer has been moved to the end of the rails of the rail system and dis-engaged from the rails in order to remove the current transformer from the switchgear compartment. The truck system with the current transformer has been placed on a table or box next to the compartment, and if the height of the box is the same height as the rails of the rail system the truck system can be easily rolled onto to the table or box. The current transformer can then be disconnected from the connection section of the truck system. A replacement current transformer connected to the connection section. The truck system can then be engaged again with the rail system and rolled forward to place the replacement current transformer in its operational location. The replacement current transformer can then be disconnected from the connection section. The truck section with can then be rolled backwards and disengaged from the rail system, and the rail system can be dismounted from the compartment.

In an example, the one or more rails of the rail system comprises at least two rails parallel to each other. In this manner, a stable platform for the truck system is provided.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails. Thus, the truck system can be easily placed on or engaged with the rail(s) of the rail system, and easily moved forward and backwards along the rail(s) to extract a current transformer, and then replace the current transformer with a new unit.

In an example, the truck system, when engaged with the one or more rails of the rail system, is configured to move the connection section in at least one direction perpendicular to the one or more rails of the rail system.

In an example, the truck system is configured to move the connection section of the truck system in a direction parallel to a direction extending from a first rail of the one or more rails to a second rail of the one or more rails, and wherein the truck system is configured to move the connection section of the truck system in a direction perpendicular to the direction extending from the first rail of the one or more rails to the second rail of the one or more rails.

In this manner, the truck system can be accurately aligned with a current transformer in order to remove it from the compartment, and indeed the truck system can also be aligned with each current transformer for each phase of a three-phase system enabling the current transformer for any of the phases to be replaced.

In a second aspect, there is provided a switchgear current transformer replacement system comprising a rail system; and a truck system. The rail system is configured to be mounted to a compartment of a switchgear. The rail system comprises one or more rails. The truck system comprises a connection section. The truck system is configured to move along the one or more rails of the rail system. The connection section of the truck system is configured to connect to a current transformer. When the rail system is mounted to the compartment of the switchgear, the truck system is configured to move along the one or more rails of the rail system to a position adjacent to the current transformer at its operational location within the compartment of the switchgear. When the truck system is adjacent to the current transformer at its operational location within the compartment of the switchgear the connection section of the truck system is configured to connect to the current transformer. When the truck system is connected to the current transformer, and when the connection section is connected to the current transformer, the truck system is configured to move along the one or more rails of the rail system with the current transformer to move the current transformer away from its operational location within the compartment of the switchgear.

In this manner, a special set of rails can be mounted to a compartment of a switchgear, for example at locations of circuit breaker rails.

Then a truck system can move along the rails in a first direction in order to move up to a current transformer in the compartment. The truck system can then connect to the current transformer in order to extract the current transformer by moving the truck system in a second direction opposite to the first direction. In this way, a simple means is provided to help replace current transformers in a switchgear compartment that only requires one side of the compartment to be opened, reducing the time to replace current transformers, reducing the chance of injury, and saving costs and work and downtime considerably. The rails can then be removed from the compartment.

In an example, the truck system is configured to engage with the one or more rails of the rail system of the compartment of the switchgear prior to moving the truck system along the one or more rails of the rail system.

Thus, the rail system that is mounted to the compartment of the switchgear can have a truck system integrated with it, or the truck system can be separate to the rail system. In this manner, the new system can be utilized with existing switchgear and their compartments in that the rail(s) are mounted to the existing compartments. Or existing rails of switchgear can be utilized, such as circuit breaker tracks or rails in certain situations, or new switchgear compartments can be manufactured with rail(s) of the new system already present with the compartment that will house current transformers.

In an example, the one or more rails of the rail system comprises at least two rails parallel to each other.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails.

In an example, the truck system when engaged with the one or more rails of the rail system is configured to move the connection section in at least one direction perpendicular to the one or more rails of the rail system.

In an example, the truck system is configured to move the connection section of the truck system in a direction parallel to a direction extending from a first rail of the one or more rails to a second rail of the one or more rails, and the truck system is configured to move the connection section of the truck system in a direction perpendicular to the direction extending from the first rail of the one or more rails to the second rail of the one or more rails.

In a third aspect, there is provided a switchgear current transformer replacement method comprising engaging a truck system with one or more rails of a rail system of a compartment of a switchgear; moving the truck system along the one or more rails of a rail system of the compartment of the switchgear to a position adjacent to a current transformer of the switchgear at its operational location within the compartment of the switchgear; connecting a connection section of the truck system to the current transformer; and moving the truck system along the one or more rails of the rail system with the current transformer to move the current transformer away from its operational location within the compartment of the switchgear.

In an example, the one or more rails of the rail system comprises at least two rails parallel to each other.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails.

In an example, the method comprises moving the connection section in at least one direction perpendicular to the one or more rails of the rail system.

In an example, the method comprises moving the connection section of the truck system in a direction parallel to a direction extending from a first rail of the one or more rails to a second rail of the one or more rails.

In an example, the method comprises moving the connection section of the truck system in a direction perpendicular to the direction extending from the first rail of the one or more rails to the second rail of the one or more rails.

In a fourth aspect, there is provided a switchgear current transformer replacement method comprising mounting a rail system to a compartment of a switchgear, wherein the rail system comprises one or more rails; moving a truck system along the one or more rails of the rail system to a position adjacent to a current transformer at its operational location within the compartment of the switchgear; connecting a connection section of the truck system to the current transformer; and moving the truck system along the one or more rails of the rail system with the current transformer to move the current transformer away from its operational location within the compartment of the switchgear.

In an example, the method comprises engaging the truck system with the one or more rails of the rail system of the compartment of the switchgear prior to moving the truck system along the one or more rails of the rail system.

In an example, the one or more rails of the rail system comprises at least two rails parallel to each other.

In an example, the truck system comprises one or more wheels that are configured to roll along the one or rails of the rail system.

In an example, the truck system comprises two or more wheels, wherein at least one wheel is configured to roll along a first rail of the at least two rails and at least one wheel is configured to roll along a second rail of the at least two rails.

In an example, at least two wheels of the truck system are configured to roll along the first rail of the at least two rails and at least two wheels of the truck system are configured to roll along the second rail of the at least two rails.

In an example, the method comprises moving the connection section in at least one direction perpendicular to the one or more rails of the rail system.

In an example, the method comprises moving the connection section of the truck system in a direction parallel to a direction extending from a first rail of the one or more rails to a second rail of the one or more rails.

In an example, the method comprises moving the connection section of the truck system in a direction perpendicular to the direction extending from the first rail of the one or more rails to the second rail of the one or more rails.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A switchgear current transformer replacement system, comprising:
a truck system having a connection section, the truck system configured to engage with and move along at least two parallel rails of a rail system of a compartment of a switchgear, wherein at least two wheels of the truck system are configured to roll along a first rail of the at least two parallel rails and at least two wheels of the truck system are configured to roll along a second rail of the at least two parallel rails;
wherein the connection section of the truck system is adapted to connect to a current transformer;
wherein the truck system when engaged with the at least two rails is configured to move the connection section in a first direction parallel to a direction extending from a first rail of the one or more rails to a second rail of the one or more rails, and wherein the truck system is configured to move the connection section in a direction perpendicular to the first direction;
wherein the truck system when engaged with the at least two parallel rails of the rail system is adapted to move along the at least two parallel rails of the rail system to a position adjacent to the current transformer at its operational location within the compartment of the switchgear;
wherein when the truck system is engaged with the at least two parallel rails of the rail system, when the truck system is adjacent to the current transformer at its operational location within the compartment of the switchgear the connection section of the truck system is adapted to connect to the current transformer; and

wherein when the truck system is connected to the current transformer, when engaged with the at least two parallel rails of the rail system and when the connection section is connected to the current transformer the truck system is configured to move along the at least two parallel rails of the rail system with the current transformer to move the current transformer away from its operational location within the compartment of the switchgear.

2. The system according to claim 1, wherein the truck system is configured to move the connection section of the truck system in a direction parallel to a direction extending from a first rail of the one or more rails to a second rail of the one or more rails, and wherein the truck system is configured to move the connection section of the truck system in a direction perpendicular to the direction extending from the first rail of the one or more rails to the second rail of the one or more rails.

3. A switchgear current transformer replacement system, comprising:
a rail system; and
a truck system;
wherein the rail system is configured to be mounted to a compartment of a switchgear;
wherein the rail system comprises at least two parallel rails;
wherein the truck system comprises a connection section;
wherein the truck system is configured to move along the at least two parallel rails of the rail system, wherein at least two wheels of the truck system are configured to roll along a first rail of the at least two rails and at least two wheels of the truck system are configured to roll along a second rail of the at least two rails;
wherein the connection section of the truck system is adapted to connect to a current transformer;
wherein the truck system when engaged with the at least two rails is configured to move the connection section in a first direction parallel to a direction extending from a first rail of the one or more rails to a second rail of the one or more rails, and wherein the truck system is configured to move the connection section in a direction perpendicular to the first direction;
wherein when the rail system is mounted to the compartment of the switchgear, the truck system is configured to move along the at least two parallel rails of the rail system to a position adjacent to the current transformer at its operational location within the compartment of the switchgear;
wherein when the truck system is adjacent to the current transformer at its operational location within the compartment of the switchgear the connection section of the truck system is adapted to connect to the current transformer; and
wherein when the truck system is connected to the current transformer, when the connection section is connected to the current transformer the truck system is configured to move along the at least two parallel rails of the rail system with the current transformer to move the current transformer away from its operational location within the compartment of the switchgear.

4. A switchgear current transformer replacement method, comprising:
engaging a truck system with at least two parallel rails of a rail system of a compartment of a switchgear, wherein at least two wheels of the truck system are configured to roll along a first rail of the at least two rails and at least two wheels of the truck system are configured to roll along a second rail of the at least two rails;

moving the truck system along the at least two parallel rails of a rail system of the compartment of the switchgear to a position adjacent to a current transformer of the switchgear at its operational location within the compartment of the switchgear;

wherein the truck system when engaged with the at least two rails is configured to move the connection section in a first direction parallel to a direction extending from a first rail of the one or more rails to a second rail of the one or more rails, and wherein the truck system is configured to move the connection section in a direction perpendicular to the first direction;

connecting a connection section of the truck system to the current transformer; and moving the truck system along the at least two parallel rails of the rail system with the current transformer to move the current transformer away from its operational location within the compartment of the switchgear.

5. The switchgear current transformer replacement method of claim 4, further comprising mounting the rail system to the compartment of the switchgear.

\* \* \* \* \*